US010638878B2

(12) United States Patent
Gergen

(10) Patent No.: US 10,638,878 B2
(45) Date of Patent: May 5, 2020

(54) COOKING ASSEMBLY

(71) Applicant: Michael Gergen, Lakeville, MN (US)

(72) Inventor: Michael Gergen, Lakeville, MN (US)

( * ) Notice: Subject to any disclaimer, the term of this patent is extended or adjusted under 35 U.S.C. 154(b) by 819 days.

(21) Appl. No.: 15/211,729

(22) Filed: Jul. 15, 2016

(65) Prior Publication Data

US 2018/0014691 A1 Jan. 18, 2018

(51) Int. Cl.
*A47J 37/00* (2006.01)
*A47J 37/04* (2006.01)

(52) U.S. Cl.
CPC .................................. *A47J 37/049* (2013.01)

(58) Field of Classification Search
CPC .......... A47J 37/04; A47J 37/049; A47J 37/06; A47J 37/0611; A47J 2037/0617; A47J 37/00
USPC ......... 99/419, 353, 402, 380, 349, 372, 382, 99/384
See application file for complete search history.

(56) References Cited

U.S. PATENT DOCUMENTS 915,105 A * 3/1909 McCaughey ......... A47J 37/049 99/397
1,297,549 A * 3/1919 De Witt .................. A47J 37/08 99/401
1,410,818 A * 3/1922 McCargar ............... A47J 37/10 99/424
2,005,010 A 6/1935 Smith
2,020,349 A * 11/1935 Bennett ................... A47J 37/06 220/4.21
2,463,439 A * 3/1949 Strietelmeier ....... A47J 37/0611 99/375
D157,614 S * 3/1950 Milano .......................... D7/352
3,358,586 A * 12/1967 Thorngren, Sr. .... A47J 37/0611 99/402
3,490,358 A * 1/1970 Bardeau ............... A47J 37/0611 99/353
D233,302 S * 10/1974 Trovinger ...................... D7/352
4,011,431 A * 3/1977 Levin ................... A47J 37/0611 219/524
4,167,900 A * 9/1979 Eichler ................ A47J 37/0611 100/226
4,773,316 A * 9/1988 Dougherty ............. A47J 37/12 99/397
4,803,918 A * 2/1989 Carbon ................ A47J 37/0611 219/524
D312,187 S * 11/1990 Khubani ........................ D7/352
D353,968 S 1/1995 Cock
6,035,767 A 3/2000 Gibson (Continued)

*Primary Examiner* — Dana Ross
*Assistant Examiner* — Ayub A Maye

(57) ABSTRACT

A cooking assembly for chambered cooking of food items with an open flame includes a pair of boxes that is hingedly coupled. Each box has a first face that is open and adjacently positionable to define a cooking space. A shaft is pivotally coupled to and extends substantially perpendicularly from the boxes. A first handle is slidably coupled to the shaft. Each of a pair of rods is pivotally coupled to and extends between the first handle and a second face of a respective box. A holder configured to hold food items is coupled to the shaft and extends into the cooking space. The boxes are configured to close around the food items when the first handle is motivated toward the boxes, such that the food items are confined in the cooking space. The shaft is configured to position the cooking space proximate to an open flame.

14 Claims, 4 Drawing Sheets

10 16 38 3 40 22 42 12 26 18 20 3 20 52

(56) References Cited

U.S. PATENT DOCUMENTS

| | | | |
|---|---|---|---|
| 6,539,844 B1 | 4/2003 | Bart | |
| D518,992 S * | 4/2006 | Howard | D7/352 |
| 7,066,510 B1 * | 6/2006 | Guintu | A47J 43/18<br>294/106 |
| D682,008 S | 5/2013 | Shahani | |
| 2007/0108183 A1 * | 5/2007 | Maupin | A47J 37/015<br>219/438 |
| 2012/0152962 A1 | 6/2012 | Arbuckle | |

* cited by examiner 12
42
18
26

20
52

46
24
14
12
30

36
20
52

COOKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cooking assemblies and more particularly pertains to a new cooking assembly for chambered cooking of food items with an open flame.

BRIEF SUMMARY OF THE INVENTION

An embodiment of the disclosure meets the needs presented above by generally comprising a pair of boxes that is hingedly coupled. Each box has a first face that is open and adjacently positionable to define a cooking space. A shaft is pivotally coupled to and extends substantially perpendicularly from the boxes. A first handle is slidably coupled to the shaft. Each of a pair of rods is pivotally coupled to and extends between the first handle and a second face of a respective box. A holder configured to hold food items is coupled to the shaft and extends into the cooking space. The boxes are configured to close around the food items when the first handle is motivated toward the boxes, such that the food items are confined in the cooking space. The shaft is configured to position the cooking space proximate to an open flame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
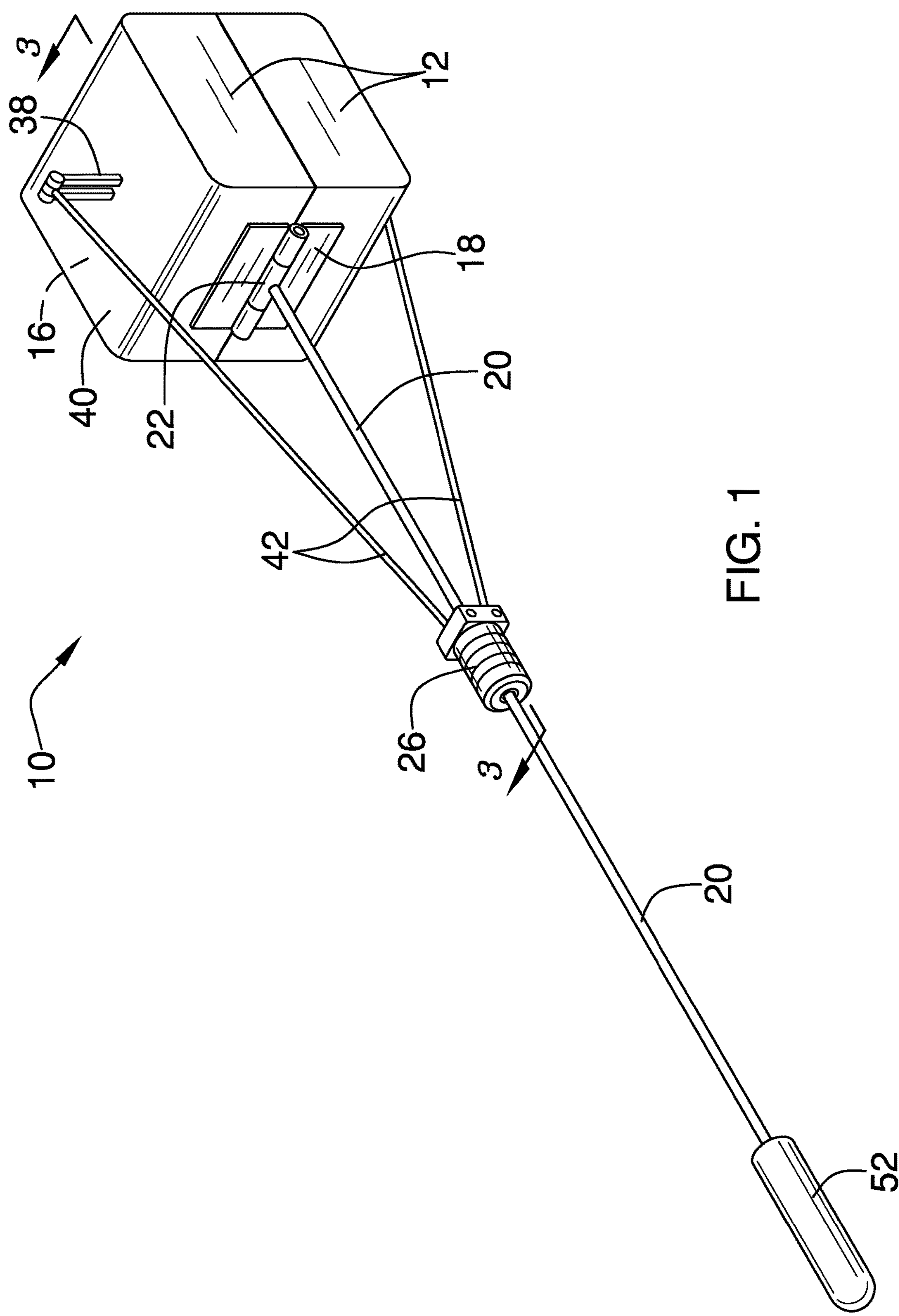
FIG. 1 is an isometric perspective view of a cooking assembly according to an embodiment of the disclosure.
Figure 2:
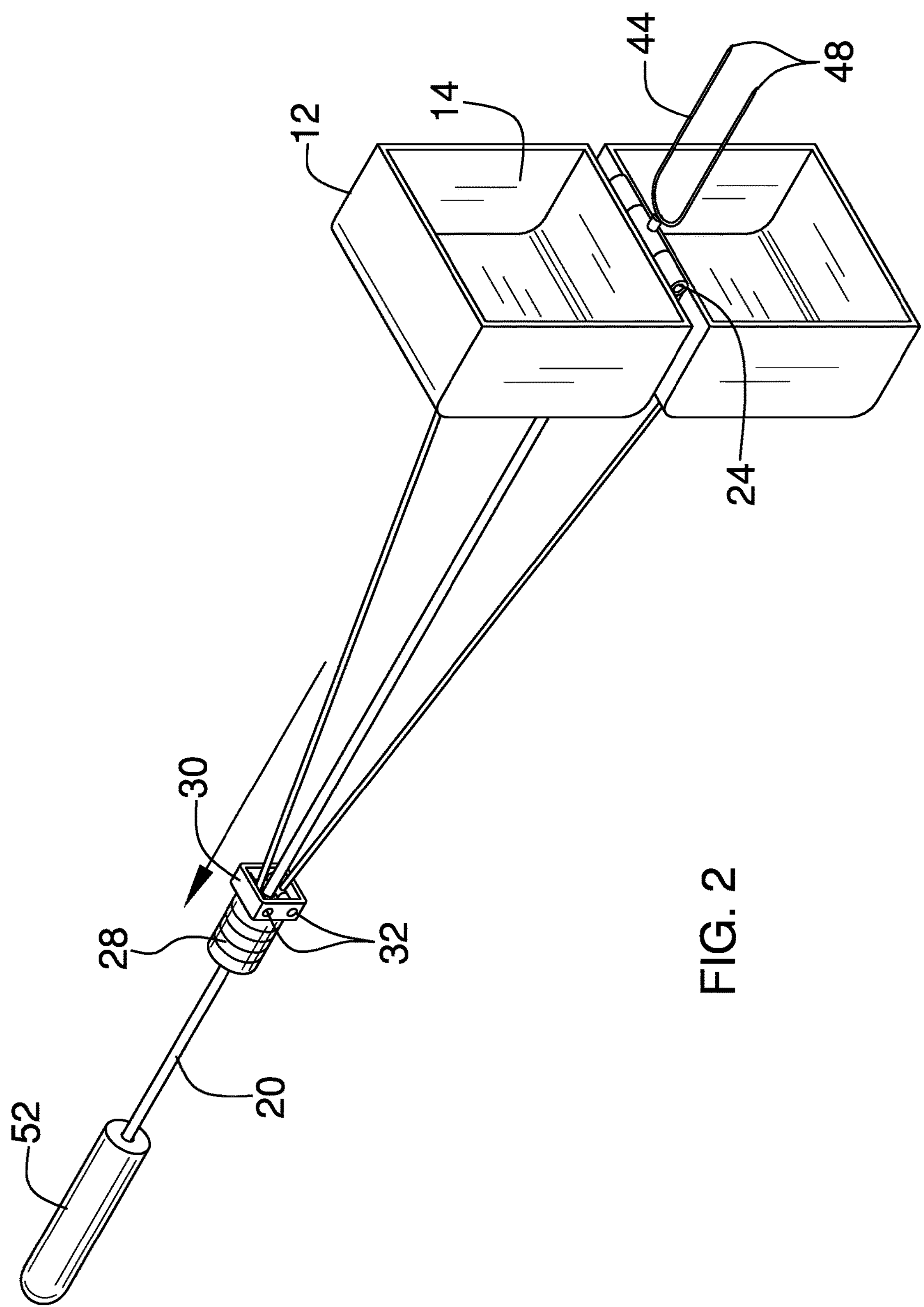
FIG. 2 is an isometric perspective view of an embodiment of the disclosure.
Figure 3:
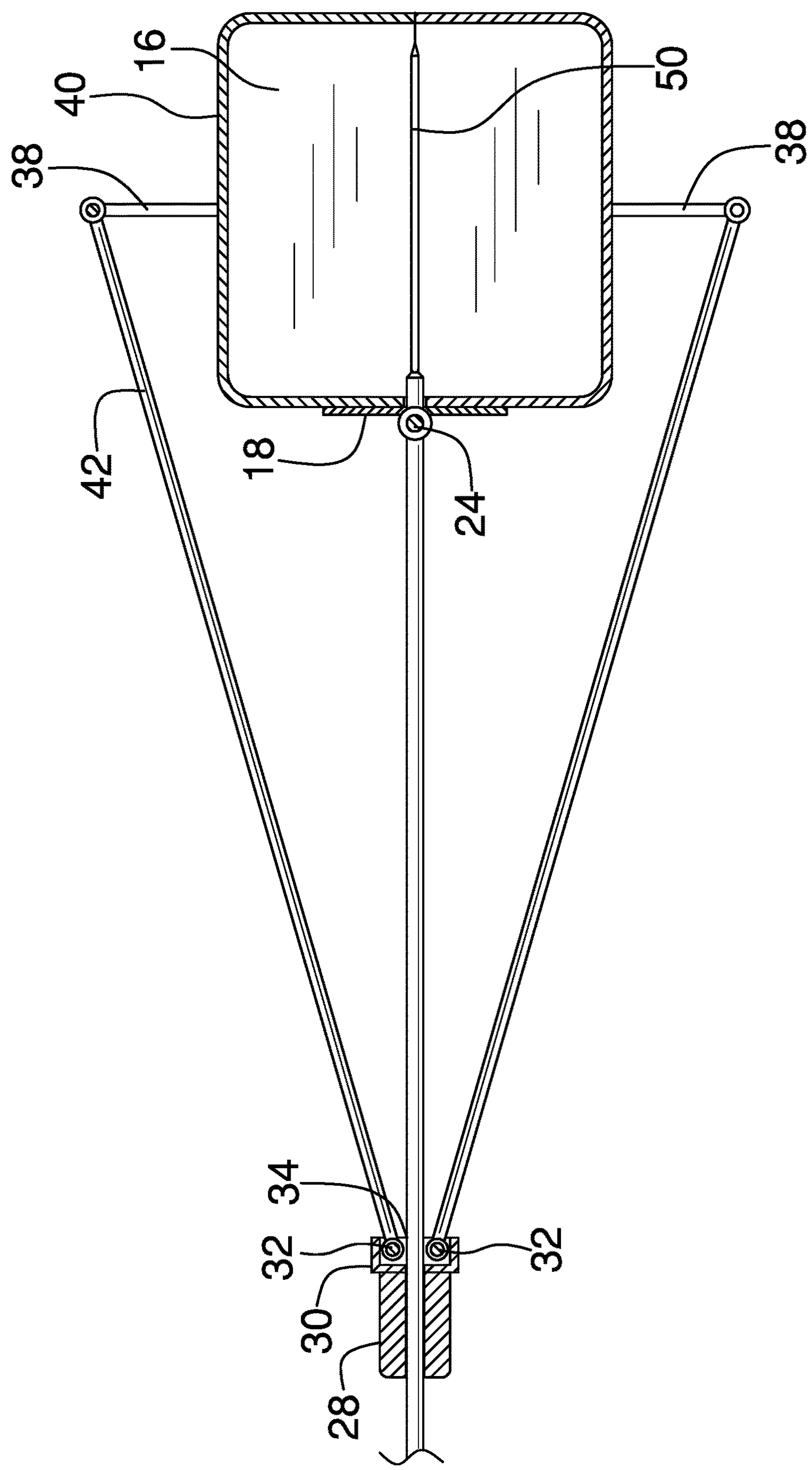
FIG. 3 is a cross-sectional view of an embodiment of the disclosure.
Figure 4:
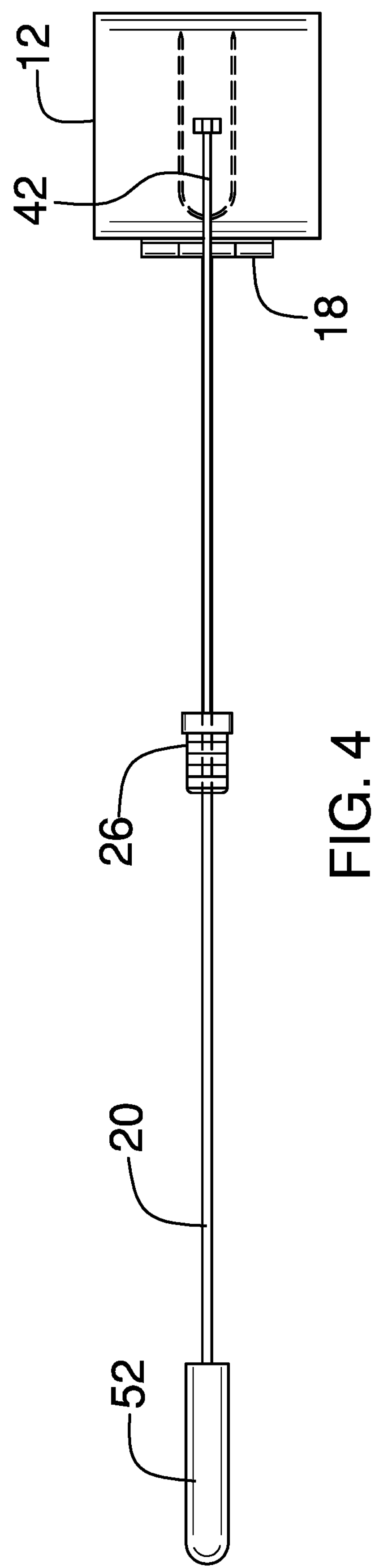
FIG. 4 is a top view of an embodiment of the disclosure.
Figure 5:
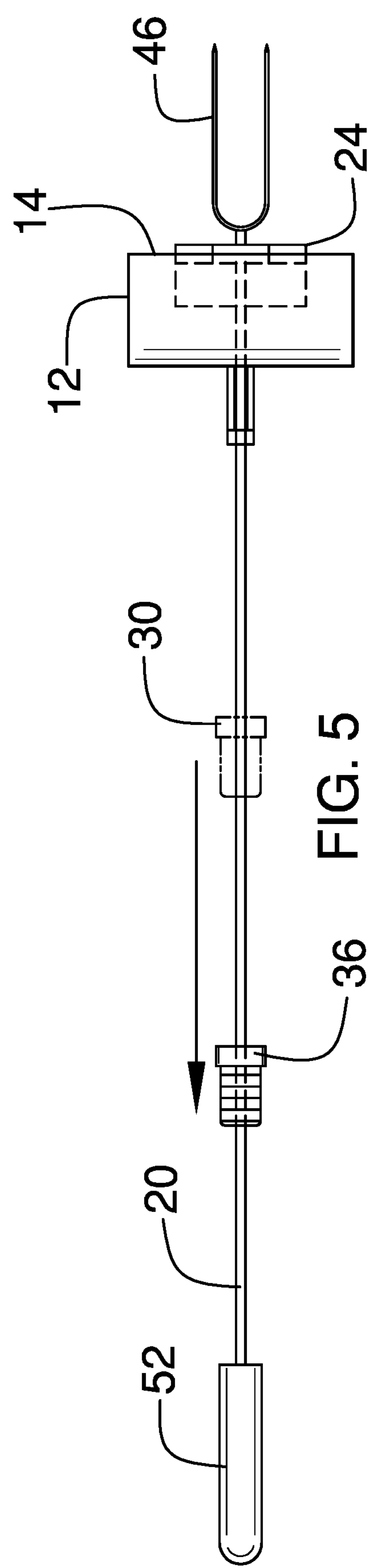
FIG. 5 is a bottom view of an embodiment of the disclosure.

With reference now to the drawings, and in particular to FIGS. 1 through 5 thereof, a new cooking assembly embodying the principles and concepts of an embodiment of the disclosure and generally designated by the reference numeral 10 will be described.

As best illustrated in FIGS. 1 through 5, the cooking assembly 10 generally comprises a pair of boxes 12 that each has a first face 14. The first faces 14 are open. The boxes 12 are hingedly coupled, such that the first faces 14 are adjacently positionable to define a cooking space 16. The boxes 12 are substantially rectangularly box shaped. The boxes 12 comprises metal. In one embodiment, the boxes 12 comprise cast iron.

A hinge 18 is coupled to and extends between the boxes 12. The hinge 18 is positioned proximate to the first faces 14 of the boxes 12. The hinge 18 is positioned on the boxes 12 such that the boxes 12 are reversibly positionable to define and allow access to the cooking space 16.

A shaft 20 is pivotally coupled to and extends substantially perpendicularly from the boxes 12 when the boxes 12 are positioned to define the cooking space 16. The shaft 20 is coupled to a ring 22 that is positioned around a pin 24 of the hinge 18. The ring 22 is positioned on the pin 24 such that the ring 22 is freely rotatable relative to the hinge 18. The shaft 20 comprises metal. In one embodiment, the shaft 20 comprises steel.

A first handle 26 is slidably coupled to the shaft 20. In one embodiment, the first handle 26 comprises plastic. In another embodiment, the first handle 26 comprises wood. The first handle 26 comprises a grip 28, a housing 30 and a pair of bars 32. The grip 28 is cylindrical. The housing 30 is coupled to the grip 28. The housing 30 has a front side 34 that is open. The pair of bars 32 is coupled to and extends between opposing sides 36 of the housing 30. The bars 32 are coplanar.

Each of a pair of extenders 38 is coupled to and extends substantially perpendicularly from a second face 40 of the respective box 12. In one embodiment, each extender 38 is substantially centrally positioned on the second face 40 of the respective box 12.

Each of a pair of rods 42 is pivotally coupled to and extends between the first handle 26 and the second face 40 of a respective box 12. In one embodiment, the rod 42 is pivotally coupled to and extends between a respective extender 38 distal from the second face 40 and a respective bar 32 of the first handle 26.

A holder 44 is coupled to the shaft 20 and extends into the cooking space 16. The holder 44 is coupled to the ring 22. The holder 44 extends substantially linearly from the shaft 20. The holder 44 comprises a fork 46. The fork 46 comprises a plurality of tines 48. In one embodiment, the plurality of tines 48 comprises two tines 48.

In another embodiment, the holder 44 comprises a plate 50. The plate 50 is coupled to the ring 22 such that the plate 50 is positioned within the cooking space 16 substantially coplanar with the second faces 40 of the boxes 12. The plate 50 is configured to hold items of food to cook within the cooking space 16.

A second handle 52 is coupled to the shaft 20 distal from the boxes 12. In one embodiment, the second handle 52 comprises plastic. In another embodiment, the second handle 52 comprises wood.

In use, the holder 44 is positioned in the cooking space 16 such that the holder 44 is configured to hold food items. The rods 42 are positioned on the boxes 12 such that the boxes 12 are configured to close around the food items when the first handle 26 is motivated toward the boxes 12, wherein the food items are confined in the cooking space 16. The shaft 20 is positioned on the boxes 12 such that the shaft 20 is configured to position the cooking space 16 proximate to an open flame.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cooking assembly comprising:

a pair of boxes each having a first face, said first faces being open, said boxes being hingedly coupled, such that said first faces are adjacently positionable defining a cooking space;

a shaft pivotally coupled to and extending perpendicularly from said boxes when said boxes are positioned to define said cooking space;

a first handle slidably coupled to said shaft;

a pair of rods, each said rod being pivotally coupled to and extending between said first handle and a second face of a respective said box;

a holder coupled to said shaft and extending into said cooking space;

wherein said holder is positioned in said cooking space such that said holder is configured for holding food items, wherein said rods are positioned on said boxes such that said boxes are configured to close around the food items when said first handle is moved toward said boxes, such that the food items are confined in said cooking space, wherein said shaft is positioned on said boxes such that said shaft is configured for positioning said cooking space proximate to an open flame;

said first handle comprising a grip, said grip being cylindrical;

a housing, said housing being coupled to said grip, said housing having a front side, said front side being open; and a pair of bars coupled to and extending between opposing sides of said housing, said bars being coplanar; and a pair of extenders, each said extender being coupled to and extending perpendicularly from said second face of said respective said box, each said extender being centrally positioned on said second face of said respective said box.

2. The assembly of claim 1, further including said boxes being rectangularly box shaped.

3. The assembly of claim 1, further including said boxes and said shaft comprising metal.

4. The assembly of claim 1, further including a hinge coupled to and extending between said boxes, said hinge being positioned proximate to said first faces of said boxes, wherein said hinge is positioned on said boxes such that said boxes are reversibly positionable to define and allow access to said cooking space.

5. The assembly of claim 1, further including a second handle coupled to said shaft distal from said boxes.

6. The assembly of claim 1, further including each said rod being pivotally coupled to and extending between a respective said extender distal from said second face and a respective said bar of said first handle.

7. The assembly of claim 3, further comprising:

said boxes comprising cast iron; and said shaft comprising steel.

8. The assembly of claim 4, further including said shaft being coupled to a ring positioned around a pin of said hinge, wherein said ring is positioned on said pin such that said ring is freely rotatable relative to said hinge.

9. The assembly of claim 5, further including said first handle and said second handle comprising plastic.

10. The assembly of claim 5, further including said first handle and said second handle comprising wood.

11. A cooking assembly comprising:

a pair of boxes each having a first face, said first faces being open, said boxes being hingedly coupled, such that said first faces are adjacently positionable defining a cooking space;

a shaft pivotally coupled to and extending perpendicularly from said boxes when said boxes are positioned to define said cooking space;

a first handle slidably coupled to said shaft; a second handle coupled to said shaft distal from said boxes;

a pair of rods, each said rod being pivotally coupled to and extending between said first handle and a second face of a respective said box;

a holder coupled to said shaft and extending into said cooking space; and wherein said holder is positioned in said cooking space such that said holder is configured for holding food items, wherein said rods are positioned on said boxes such that said boxes are configured to close around the food items when said first handle is moved toward said boxes, such that the food items are confined in said cooking space, wherein said shaft is positioned on said boxes such that said shaft is configured for positioning said cooking space proximate to an open flame;

a hinge coupled to and extending between said boxes, said hinge being positioned proximate to said first faces of said boxes, wherein said hinge is positioned on said boxes such that said boxes are reversibly positionable to define and allow access to said cooking space, said shaft being coupled to a ring positioned around a pin of said hinge, wherein said ring is positioned on said pin such that said ring is freely rotatable relative to said hinge; said holder being coupled to said ring; said holder extending linearly from said shaft; and said holder comprising a fork, said fork comprising a plurality of tines.

12. The assembly of claim 11, further including said plurality of tines comprising two tines.

13. The assembly of claim 11, further including said holder comprising a plate, wherein said plate is coupled to said ring such that said plate is positioned within said cooking space substantially coplanar with said second faces of said boxes, such that said plate is configured for holding items of food for cooking within said cooking space.

14. A cooking assembly comprising:

a pair of boxes each having a first face, said first faces being open, said boxes being hingedly coupled, such that said first faces are adjacently positionable defining a cooking space, said boxes being rectangularly box shaped;

a hinge coupled to and extending between said boxes, said hinge being positioned proximate to said first faces of said boxes, wherein said hinge is positioned on said boxes such that said boxes are reversibly positionable to define and allow access to said cooking space;

a shaft pivotally coupled to and extending perpendicularly from said boxes when said boxes are positioned to define said cooking space, said shaft being coupled to a ring positioned around a pin of said hinge, wherein said ring is positioned on said pin such that said ring is freely rotatable relative to said hinge, said shaft comprising steel;

a first handle slidably coupled to said shaft, said first handle comprising: a grip, said grip being cylindrical, a housing, said housing being coupled to said grip, said housing having a front side, said front side being open, and a pair of bars coupled to and extending between opposing sides of said housing, said bars being coplanar;

a pair of extenders, each said extender being coupled to and extending perpendicularly from a second face of said respective said box, each said extender being centrally positioned on said second face of said respective said box; a pair of rods, each said rod being pivotally coupled to and extending between said first handle and said second face of a respective said box, each said rod being pivotally coupled to and extending between a respective said extender distal from said second face and a respective said bar of said first handle;

a holder coupled to said shaft and extending into said cooking space, said holder being coupled to said ring, said holder extending linearly from said shaft, said holder comprising a fork, said fork comprising a plurality of tines, said plurality of tines comprising two tines; a second handle coupled to said shaft distal from said boxes; wherein said holder is positioned in said cooking space such that said holder is configured for holding food items, wherein said rods are positioned on said boxes such that said boxes are configured to close around the food items when said first handle is moved toward said boxes, wherein the food items are confined in said cooking space, such that said shaft is positioned on said boxes such that said shaft is configured for positioning said cooking space proximate to an open flame.

* * * * *